Aug. 18, 1936.   R. J. COUTURE   2,051,682
SANDWICH BISCUIT WITH MEANS FOR FASTENING FILLING
Original Filed May 15, 1935
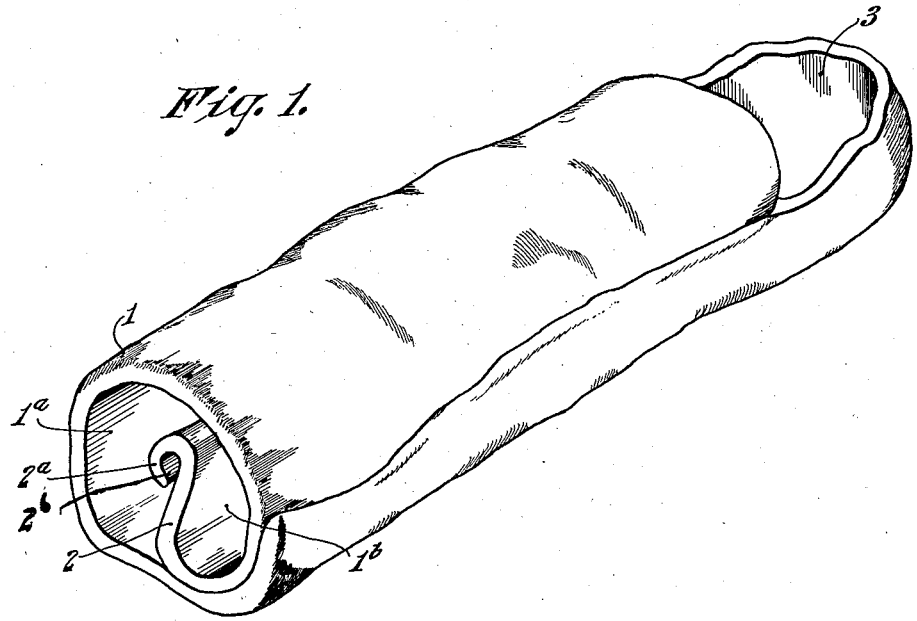
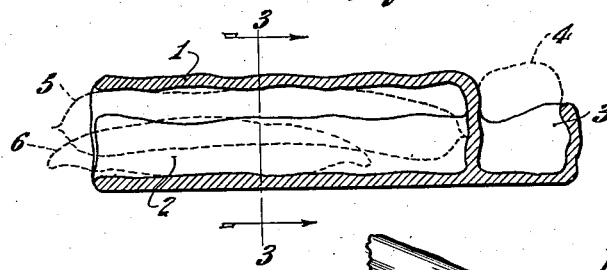
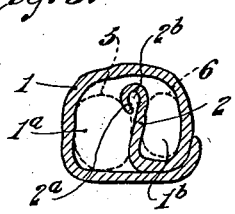
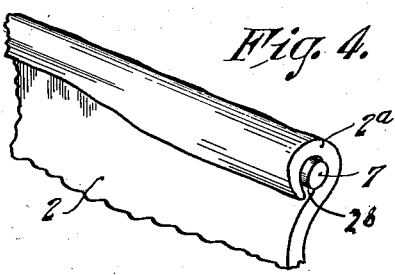
INVENTOR,
Romeo J. Couture,
BY
Richard J. Talbot
ATTORNEY.

Patented Aug. 18, 1936

2,051,682

UNITED STATES PATENT OFFICE 2,051,682

SANDWICH BISCUIT WITH MEANS FOR FASTENING FILLING

Romeo J. Couture, Springfield, Mass., assignor of one-half to Richard J. Talbot

Substitute for application Serial No. 671,019, May 15, 1935. This application December 30, 1935, Serial No. 56,832

8 Claims. (Cl. 99—88)

My invention relates to improvements in sandwich biscuits for quantity production and means for fastening the filling. The object of my invention is to provide an edible biscuit in which two or more varieties of sandwich filling may be placed in a longitudinal chamber within the biscuit and pressed therein in a position so that the same will be firmly fixed within the biscuit and further to provide a chamber separated from the longitudinal chamber in the biscuit in which a dessert or confection may be placed.

This application is a substitute for application filed by me on May 15, 1933, Serial Number 671,019.

I obtain these objects by the means illustrated in the accompanying drawing in which Figure 1 represents a view of the sandwich biscuit.

Figure 2 represents a sectional view of the sandwich biscuit showing a sausage in one compartment, a vegetable in another compartment and a confection in the third compartment.

Figure 3 is an end section of Figure 2 at line 3—3.

Figure 4 is a plan view of a part of the flange showing an edge curved to form a channel 2b. This construction shows the flange 2 as being slightly wedge shaped. The wide portion of the wedge at the open end of biscuit is made wider by the bending of the flange 2 and the bent section 2a is tapered from the open end toward the closed end so that the flange will form a longitudinal wedge and the filling will normally crowd toward the closed end and this tendency is increased by the pressure of the hand and teeth while the sandwich is being eaten.

The biscuit is made by rolling dough into a thin sheet and shaping the same, before baking, over a mold which extends part way into the biscuit so that the longitudinal chambers in the biscuit may be of predetermined length and size.

One of the ends of the biscuit may be made open and the opposite end closed by pressing the dough about one end of the mold. A chamber is formed in the closed end and the biscuit is thereupon baked on the mold, which subsequently is removed, leaving a chamber divided by the flange within the biscuit and a cup shaped container, open at the top, at the closed end of the biscuit.

1 represents the outer shell of the biscuit. 1a represents a chamber within the biscuit for receiving a sausage or other filling. 1b represents a second chamber within the biscuit for the reception of a wedge, such as pieces of potato, celery or pickle or other edible substance. 2 represents a flange of the same material as the shell which is pliable sidewise by pressure when filling. 2b represents a section of the flange 2 which is preferably bent at the edge so as to form a channel as shown at 2b. 3 represents a container formed in the biscuit prior to baking. 4 represents a filling for the chamber 3. 5 represents a filling for the chamber 1a. 6 represents a filling for the chamber 1b which also serves as a wedge to hold the filling 5 in place. 7 represents a filling of butter or mustard which may be frozen into the required shape and inserted in 2b, the heat of the biscuit or a meat filling being intended to melt the same.

The flange 2 is made as a part of the shell 1, but an end 2a is left free so that the same is pliable and the edge may be wedge shaped as shown in Figure 4. When the chamber 1a is filled, the filling is then inserted in the chamber 1b and as the same is pressed inward it is designed to be of greater diameter than the width of the chamber 1b. The result of pressing the filling in the chamber 1b is to wedge the pliable flange 2 against the contents of 1b so that the same becomes firmly attached. A roll of butter may be placed in 2b, the heat of the meat filling acting as a means for melting.

The slightly thickened upper section of the flange formed by bending over the edge of 2 and shown at 2a may be used as a means for more securely holding the contents of 1a and 1b in place and may be flattened out by the pressure between the two fillings so that the resiliency of 2a adds additional pressure as against the surface of the fillings hereinbefore described, and wedging the contents between the shell 1 and flange 2.

Having thus described my invention, what I claim as new and desire to have secured by Letters Patent, is:

1. The combination with a biscuit made with a hollow interior and an open and a closed end formed during the baking process, of an internal flange formed therewith, the flange being attached at one side to the interior of the biscuit and having the other edge free, the flange being pliable tapering lengthwise from the open end of the biscuit towards the closed end.

2. An elongated biscuit having an internal longitudinal chamber closed at one end, open at the other and containing a sidewise pliable, dividing flange of the same material as the biscuit, the flange being attached at one side of the chamber and having the other edge free, the outer edge being bent, comprising a channel at the edge of the flange and resilient means for compressing when pressure is applied by filling the biscuit.

3. An elongated biscuit having an internal longitudinal chamber closed at one end, open at the other and a pliable dividing flange of the same material as the biscuit, the divider being attached at one side of the chamber and having the other edge free, the space on either side of the flange forming a food receptacle and the flange comprising a means whereby after filling one side, the food is wedged in place by crowding an edible substance at the other side of the flange.

4. An elongated biscuit having an internal longitudinal chamber closed at one end, open at the other and containing a pliable dividing flange of the same material as the biscuit, the divider being attached at one side of the chamber and having the other edge free, the space on either side of the flange forming a food receptacle and the flange comprising a means whereby after filling one side, the food is wedged in place by crowding an edible substance at the other side of the flange, and a container for a dessert formed by a cup shaped opening in the closed end of the biscuit.

5. A sandwich biscuit having an open and a closed end, and having an internal, longitudinal open space comprising means for receiving a filler; and a longitudinal, internal, pliable flange forming an edible part of the biscuit, the flange being a continuation of one side of the biscuit and having the other edge free.

6. A biscuit as described in claim 5 with the addition of an open topped cup of the same material as the biscuit, at the closed end of the biscuit and formed therewith during the process of baking.

7. An elongated interiorly hollow sandwich biscuit having an open end for receiving a filling and a closed end for retaining the filling, the longitudinal hollow part of the biscuit being formed by folding one of the longitudinal edges upon the other edge with the edges united during the process of baking, forming resilient means within the biscuit for allowing pressure on the filling without opening the biscuit longitudinally.

8. An elongated interiorly hollow sandwich biscuit having an open end for receiving the filling and a closed end for retaining the filling, the longitudinal hollow part of the biscuit being formed by folding one of the longitudinal edges upon the other edge with the edges united during the process of baking, and one or both of the edges projecting into the hollow part of the biscuit for tensioning the filling.

ROMEO J. COUTURE.